United States Patent
Upadhyaya et al.

(10) Patent No.: US 10,057,875 B2
(45) Date of Patent: Aug. 21, 2018

(54) LOCATION-BASED NETWORK DEVICE OPERATION

(71) Applicant: Aruba Networks, Inc., Sunnyvale, CA (US)

(72) Inventors: Vigneshwara Upadhyaya, Bangalore (IN); Gopakumar Nambisan, Bangalore (IN)

(73) Assignee: Hewlett Packard Eneterprise Development LP, Houston, TX (US)

( * ) Notice: Subject to any disclaimer, the term of this patent is extended or adjusted under 35 U.S.C. 154(b) by 0 days.

(21) Appl. No.: 15/337,568

(22) Filed: Oct. 28, 2016

(65) Prior Publication Data
US 2018/0124734 A1    May 3, 2018

(51) Int. Cl.
| H04W 24/00 | (2009.01) |
| H04W 64/00 | (2009.01) |
| H04W 52/02 | (2009.01) |
| H04W 4/02 | (2018.01) |
| H04W 4/029 | (2018.01) |

(52) U.S. Cl.
CPC ......... *H04W 64/003* (2013.01); *H04W 4/028* (2013.01); *H04W 4/029* (2018.02); *H04W 52/0251* (2013.01)

(58) Field of Classification Search
CPC ............... H04W 64/003; H04W 4/028; H04W 52/0251
USPC .............................. 455/456.1–456.3; 370/338
See application file for complete search history.

(56) References Cited

U.S. PATENT DOCUMENTS

| 8,254,902 | B2 | 8/2012 | Bell | |
| 9,332,385 | B1* | 5/2016 | Abraham | H04W 4/02 |
| 2003/0008662 | A1* | 1/2003 | Stern | H04M 1/72572 |
| | | | | 455/456.1 |
| 2010/0056124 | A1 | 3/2010 | Keating et al. | |
| 2014/0242961 | A1* | 8/2014 | Bruins | H04W 4/001 |
| | | | | 455/418 |
| 2014/0330945 | A1* | 11/2014 | Dabbiere | H04L 41/0843 |
| | | | | 709/220 |

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE USA.
Wi-Fi Alliance, "Wi-Fi Peer-to-Peer (P2P) Technical Spec. V. 1.5", Aug. 4, 2014, 13 pages, WiFi Alliance, USA.
Wi-Fi Alliance, "Wi-Fi Certified Wi-Fi Direct: Personal, portable Wi-Fi to connect devices anywhere, anytime", Sep. 2014, 8 pages, WiFi Affiance, USA.

(Continued)

*Primary Examiner* — Marcos Batista
(74) *Attorney, Agent, or Firm* — Brooks, Cameron & Huebsch, PLLC (57) ABSTRACT

Example implementations relate to location-based network device operation. For example, a non-transitory machine-readable medium is described that stores instructions executable by a processor to cause the processor to provide network permissions to a network device joining a network; responsive to acceptance of the network permissions, propagate a location policy to the network device; and modify an operating mode of the network device based on the determined location and the location policy.

13 Claims, 4 Drawing Sheets

(56) References Cited

OTHER PUBLICATIONS

IEEE Computer Society, "IEEE Standard for Air Interface for Broadband Wireless Access Systems; IEE Std 802.16-2012", Aug. 17, 2012, 3 pages, IEEE, USA.
Bluetooth, "Specification of the Bluetooth System", Dec. 2, 2014, 3 pages, Covered Core Package version 4.2, Bluetooth SIG Inc., USA.
IEEE Computer Society, "IEEE Standard for Local and Metropolitan Area Networks: Overview and Architecture; IEEE Std 802-2014", Jun. 12, 2014, 18 pages, IEEE, USA.
Wikipedia, https://en.wikipedia.org/wiki/Internet_Protocol, "Internet Protocol", Jan. 1, 2015, 6 pages, Wikipedia, USA.
USB Technology, http://www.usb.org/developers/docs/, "USB 3.1 Specification", Jul. 26, 2013, 37 pages, USB Implementers Forum Inc, USA.
Wikipedia, https//en.wikipedia.org/wiki/Asynchronous_Transfer_Mode, "Asynchronous Transfer Mode", Dec. 31, 2014, 11 pages, Wikipedia, USA.

\* cited by examiner

LOCATION-BASED NETWORK DEVICE OPERATION

BACKGROUND

The location of a network device such as a mobile phone may be determined with respect to a network comprising multiple known points. These known points may be wireless nodes whose locations are known a priori. These nodes may thus act as reference for identification of a location of the wireless device. The location of the network device may be determined relative to the network using techniques such as trilateration, multilateration, and/or triangulation.

DETAILED DESCRIPTION

Network devices may be operated at the will of a user, with operational settings chosen by the individual. As used herein, 'network device' generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, operational settings refer to configurable settings of a network device that affect the operation of the network device. Examples of operational settings include ring tone, notification tone, audio and/or video recording settings, and wireless connectivity settings, among other examples. There may be instances when the user-configurable operational settings may be undesirable. For instance, during a conference or in a hospital emergency room, it may be undesirable to hear ring tones or notifications of a network device. Similarly, when boarding an air craft, it may be asked that mobile phones be placed in aircraft mode, yet some passengers may disregard such requests. In yet another example, at a strategic defense installation, it may be desirable that recording capabilities are disabled.

Location-based network device operation, as described herein, may allow for propagation of usage policies to network devices. As described herein, a policy server may dictate the location based network device location policy. That is, when a network device joins a network, the user of the network device may be asked to accept network permissions associated with the network. Subsequently, the network may detect the location of the network device. If the network device is in a particular location, a location policy may be enforced which limits certain capabilities of the network device.

For instance, if a network is a hotel WiFi in a conference room, a location policy may force network devices into silent notification mode within the conference room. When network devices move into the conference room, the network device may be instructed by the network to change the notification mode of network devices to silent.

Figure 1:
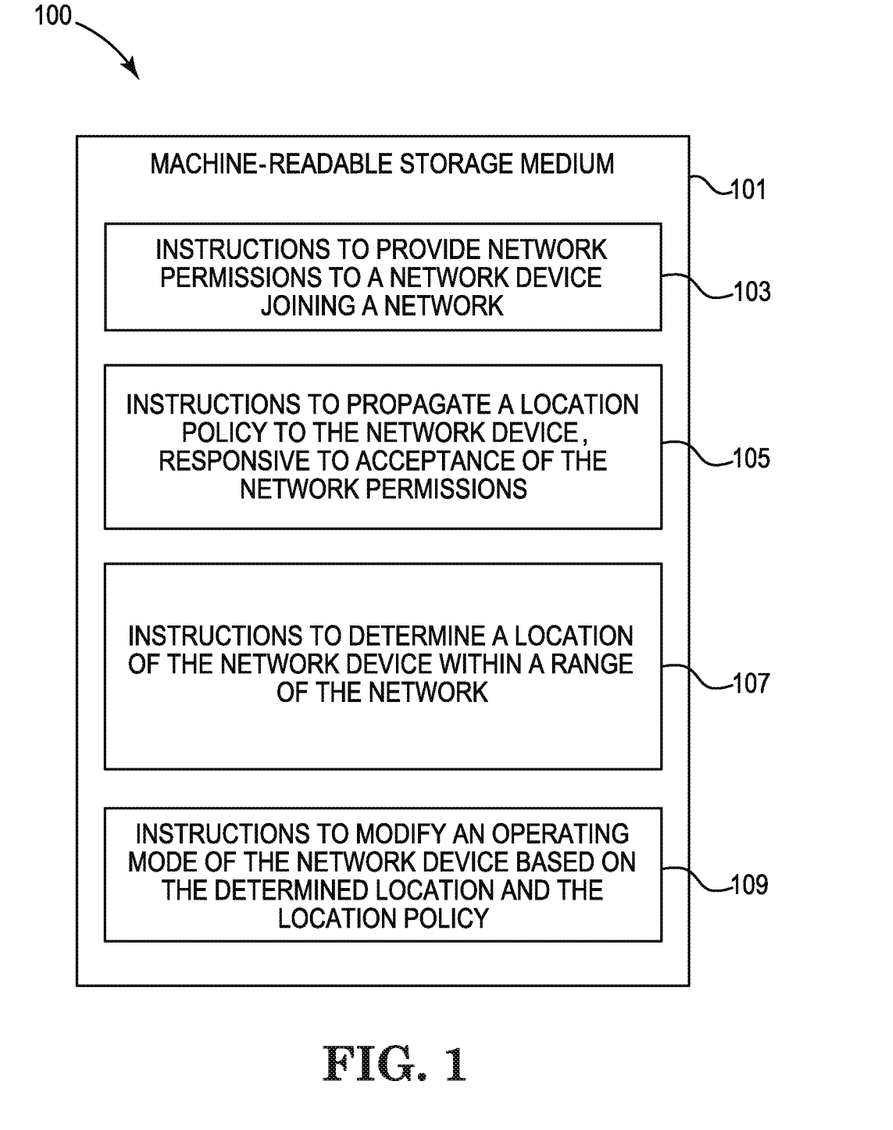
FIG. 1 illustrates an example environment, consistent with the present disclosure.

FIG. 1 illustrates an example environment 100, consistent with the present disclosure. As described herein, the components illustrated in FIG. 1 may perform a number of functions related to location-based network device operation. Although the following descriptions refer to a single processing resource and a single machine-readable storage medium 101, the descriptions may also apply to a system with multiple processing resources and multiple machine-readable storage mediums. In such examples, the environment 100 may be distributed across multiple machine-readable storage mediums and multiple processing resources. Put another way, the instructions executed in the environment 100 may be stored across multiple machine-readable storage mediums and executed across multiple processing resources, such as in a distributed or virtual computing environment.

As illustrated in FIG. 1, the environment 100 may comprise a non-transitory machine-readable storage medium 101 storing machine readable instructions to cause a processing resource (not illustrated in FIG. 1) to perform a number of operations relating to location-based network device operation. The processing resource may be a central processing unit (CPU), microprocessor, and/or other hardware device suitable for retrieval and execution of instructions stored in machine-readable storage medium 101.

Although the following descriptions refer to a single processor and a single machine-readable storage medium, the descriptions may also apply to a system with multiple processors and multiple machine-readable storage mediums. In such examples, the environment 100 may be distributed across multiple machine-readable storage mediums and the services controller may be distributed across multiple processors, such as in a distributed or virtual computing environment.

The environment 100 may include instructions 103 stored in the non-transitory machine-readable storage medium 101 and executable by the processing resource to provide network permissions to a network device joining a network. For instance, when a network device joins a network, such as a 2G/3G/4G, WiFi or other kind of network, the user of the network may be asked to accept the permissions of the network as a condition of joining the network. The permissions of the network may govern a plurality of aspects of network usage. For example, the permissions may govern the usage of camera, notification modes, airplane mode, Bluetooth usage, and location enabling, among other policies. Network permissions may include usage policies, as described herein. That is, as a condition of using the network, a user may be asked to agree to particular location policies.

The environment 100 may include instructions 105 stored in the non-transitory machine-readable storage medium 101 and executable by the processing resource to propagate a location policy to the network device, responsive to acceptance of the network permissions. That is, the location policy and/or location policies governing the usage of the network devices may be pushed to the network device joining the network.

This location policy and/or policies may be pushed to the network device but may regulate the operational settings of the network device when the network device is in particular locations. As such, the environment 100 may include instructions 107 stored in the non-transitory machine-readable storage medium 101 and executable by the processing resource to determine a location of the network device within a range of the network. As used herein, the range of the network refers to the geographic area that is serviced by the wireless network. The instructions 107 may identify the location of the network device, and determine if the location of the network device is a location where operational settings are restricted. Put another way, the instructions 107 may identify if the network device is in a sensitive location within the network. As used herein, a sensitive location refers to a location within a network where at least some of the operational settings of network devices are restricted.

The environment 100 may include instructions 109 stored in the non-transitory machine-readable storage medium 101 and executable by the processing resource to modify an operating mode of the network device based on the determined location and the location policy. As used herein, an operating mode refers to a collection of operational settings of the network device. For instance, an operating mode may refer to a mode of the network device where notifications are turned off and recording capabilities are disabled. In another example, an operating mode may refer to a mode of the network device where network transmissions and telecommunications are disabled. Examples are not so limited, however, and an operating mode of a network device may refer to any combination of operational settings which may be defined by a location policy.

In some examples, different locations within the network may have different location policies, and therefore may enforce different operating modes. For example, a first location within the range of the network may be associated with a first operating mode. The non-transitory machine-readable storage medium 101 may store instructions to determine a second location of the network device within the range of the network, and modify the operating mode of the network device based on the second determined location and the location policy. That is, if the network device moves from a first location within the network that is not sensitive, to a second location within the network that is sensitive, the operating mode of the network device may be modified according to the movement of the device to the sensitive location. Similarly, if the network device moves from a first location in the network that is sensitive, to a second location within the network that is not sensitive, the operating mode of the network device may be modified according to the movement of the device out of the sensitive location.

As described herein, to modify the operating mode of the network device may refer to modification of a variety of operational settings of the network device. For example, in some examples, the instructions 109 to modify the operating mode of the network device may include instructions to modify a camera functionality of the network device. Similarly, the instructions 109 to modify the operating mode of the network device may include instructions to modify a network connection setting of the network device, such as Wi-Fi capabilities, Bluetooth capabilities, and/or location detection capabilities, among others. In some examples, the instructions 109 to modify the operating mode of the network device may include instructions to modify a ring volume of the network device. That is, the instructions 109 may place the network device in silent mode. In another example, the instructions 109 may reduce the ring tone and/or notification volume of the network device to a volume below a threshold volume.

In some examples, the medium 101 may include instructions to determine that the network device is no longer in the first location, and terminate the operating mode on the network device responsive to the determination that the network device is no longer in the first location. That is, once the network device moves from one location to another within the network, the operating mode may be adjusted accordingly. Similarly, once the network device moves to a location outside of the network, all operating modes may be removed, as the location policy may be lifted completely.

As described herein, a location analytics device and a location policy device may detect the location of the network device and control it when the network device enters that location. For example, there may be a location policy that recording capabilities such as camera may not be used in a particular location. By disabling recording capabilities as part of the location policy of the network that the network device is connected to, the recording device may be automatically turned off based on location. The same may be done for an airport runway. When the aircraft is in takeoff position, the network may detect the location and turn on aircraft mode automatically. If a network device is joining the aircraft WiFi, the location policy of the network device can be dictated by the aircraft WiFi. Similarly, a network device in a hospital may be located and automatically changed to silent notification mode by the location policy.

Figure 2:
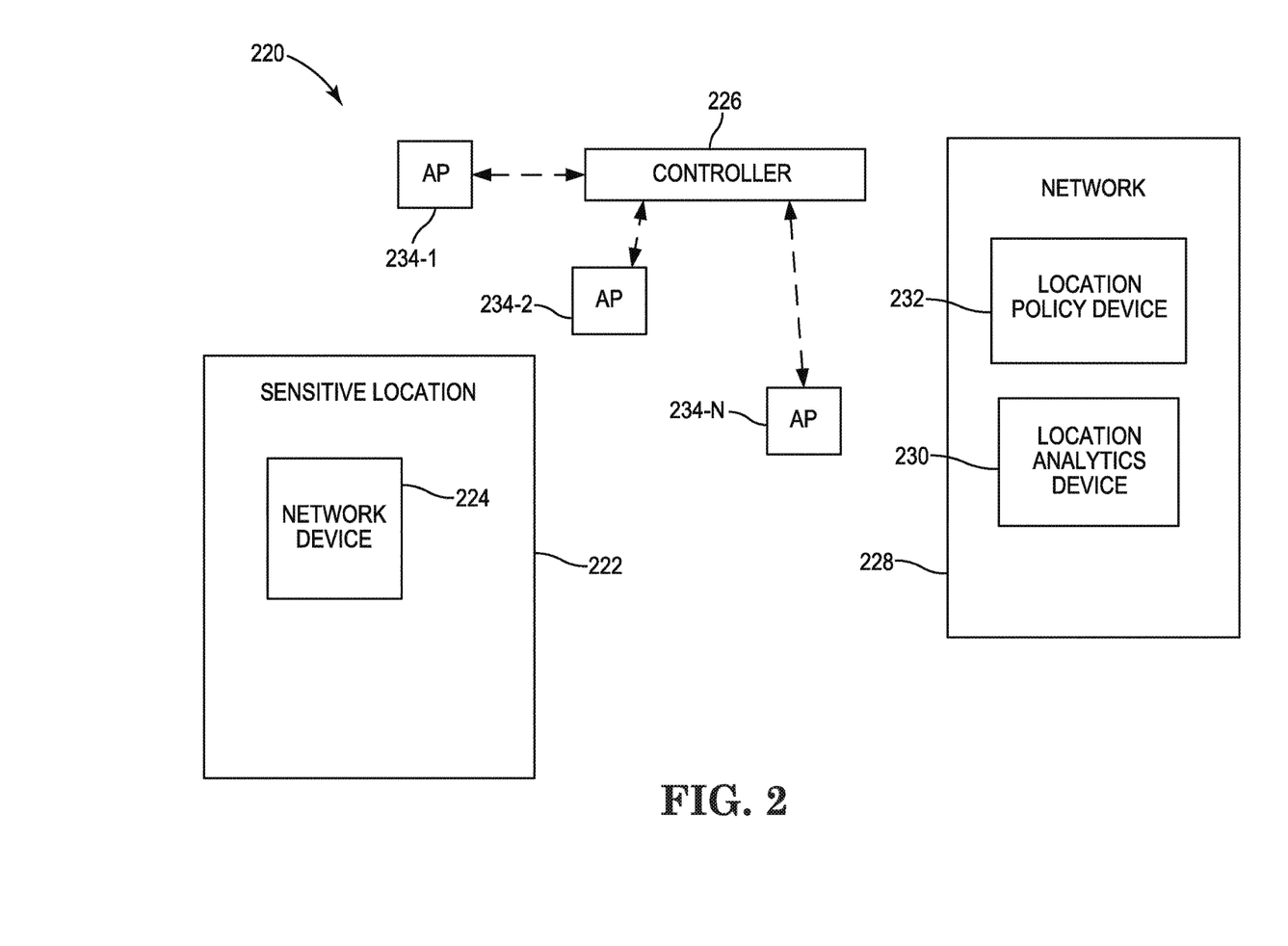
FIG. 2 is a block diagram of an example network, consistent with the present disclosure.

FIG. 2 is a block diagram of an example network 220, consistent with the present disclosure. As illustrated in FIG. 2, the network 220 may include a plurality of components. For instance, the network 220 may include a central management system 228 including a user authentication policy device 232 and a location analytics device 230. As used herein, a central management system refers to components of a network that manages other portions of the network 220. As used herein, a location analytics device refers to a device that provides location analytics functionality for other programs and/or devices, as described herein. As such, location analytics device 230 may be referred to as a server, though examples are not so limited. For example, the location analytics device 230 may determine a location of a device, such as network device 224. Similarly, as used herein, a location policy device refers to a device that provides location policy functionality for other programs and/or devices, as described herein. As such, location policy device 232 may be referred to as a server, though examples are not so limited. For example, location policy device 232 may determine a location policy that governs, based on a location of network device 224, as determined by location analytics device 230.

The example network 220 may also include a controller 226 and a plurality of access points (APs) 234-1, 234-2 . . . 234-N (collectively referred to herein as APs 234). Although FIG. 2 illustrates the controller 226 and the APs 234 as being outside of central management system 228, examples are not so limited, and central management system 228 may be illustrated to include controller 226 and APs 234. As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards. As used herein, a controller refers to a device capable of communicating between various network components, such as APs 234 and central management system 228 (e.g., devices 232 and 230).

Also, the example network 220 may include a sensitive location 222. Again, as used herein, a sensitive location refers to a location within a network where at least some of the operational settings of network devices are restricted. That is, when a device is located within sensitive location 222, at least some of the operational settings of the device may be restricted. For example, network device 224 may be a tablet computer, a laptop computer, and/or a mobile phone, among other examples. The network device 224 may move between various locations, and within or outside of a particular network. For instance, network device 224 may move into sensitive location 222, and APs 234 may gather access point data for network device 224. As used herein, access point data refers to packet transmission data for transmissions between the network device 224 and APs 234. The access point data may include received signal strength indicator (RSSI) data, Time-of-Flight (ToF) data, Time-of-Arrival (ToA) data, and/or Angle-of-Arrival (AoA) data, among other examples. The APs 234 may communicate the access point data to controller 226, which may communicate the access point data to location analytics device 230. The location analytics device 230 may determine the location of network device 224, using the access point data. That is, the location analytics device 230 may determine that network device 224 is within sensitive location 222, using the access point data received from APs 234. Similarly, location analytics device 230 may determine that network device 224 is not within sensitive location 222.

Moreover, while one sensitive location 222 is illustrated in FIG. 2, examples are not so limited. For instance, in some examples, an environment may include a plurality of sensitive locations. Take for example an airport. A first sensitive location may include a security screening area for passengers, where the first sensitive location has a first set of usage restrictions, such as restricted audio and visual recording capabilities and/or restricted telecommunications capabilities. Similarly, a second sensitive location may include the air craft boarding location and runway, where a second set of usage restrictions are applied, such as airplane mode for wireless communications and telecommunications. Moreover, the airport may have non-sensitive locations, such as a cafeteria, where operation of network devices are not modified. Each of the sensitive locations and the non-sensitive locations may be in the range of the same network. As used herein, to be in 'the range' of a particular network refers to a network device being within range of an access point of the network. For example, to be "in the range" of network 220, a network device may be close enough in physical proximity to communicate with at least one of APs 234.

The location analytics device 230 may communicate with the location policy device 232. That is, location analytics device 230 may communicate a location of network device 224 with location policy device 232. The location policy device 232 may store a plurality of policies governing the usage of network devices in particular locations. For example, the location policy device 232 may store a first location policy that specifies that a first operation mode applies in a first sensitive location, a second operation mode applies in a second sensitive location, and a default operation mode applies in all other locations within the network. The location policy device 232, alone or in combination with the location analytics device 230, may transmit to the network device 224, instructions to modify an operational mode based on the location policy of the particular location of the network device. In such a manner, the location policy device 232 and the location analytics device 230 may detect a location of a network device within the network, and modify an operational mode of the network device based on defined policies. Similarly, the controller 226, alone or in combination with the location policy device 232 and the location analytics device 230, may transmit the instructions to modify an operational mode of the network device based on the defined policies.

Figure 3:
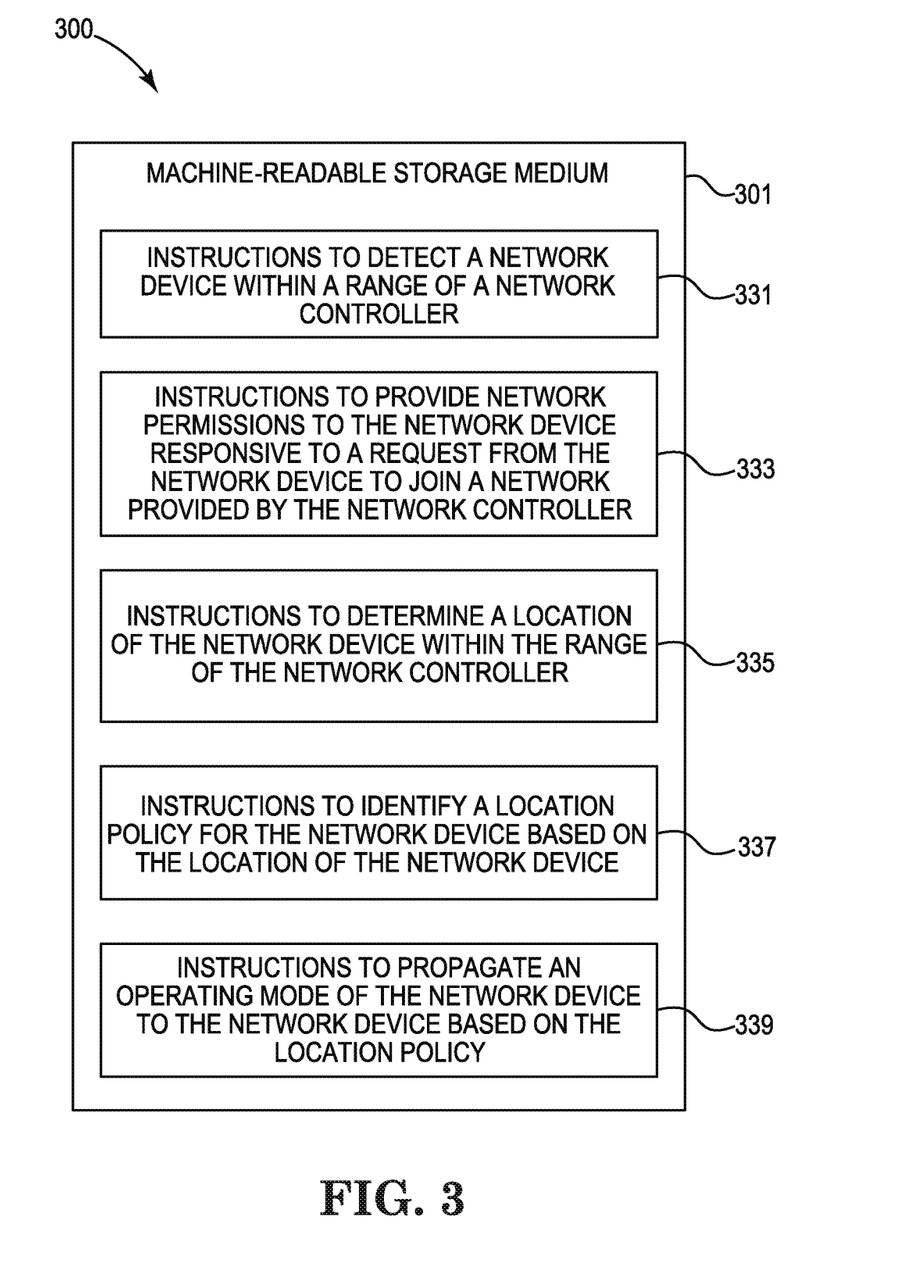
FIG. 3 is a block diagram of an example environment, consistent with the present disclosure.

FIG. 3 is a block diagram of an example environment 300, consistent with the present disclosure. The environment 300 may be analogous to the environment 100 illustrated in FIG. 1. Although the following descriptions refer to a single processor and a single machine-readable storage medium, the descriptions may also apply to a system with multiple processors and multiple machine-readable storage mediums. In such examples, the environment 300 may be distributed across multiple machine-readable storage mediums and multiple processors. Put another way, the instructions executed by the services controller may be stored across multiple machine-readable storage mediums and executed across multiple processors, such as in a distributed or virtual computing environment.

The environment 300 may include instructions 331 stored in the machine-readable storage medium 301 and executable by a processing resource to detect a network device within a range of a network controller. For instance, referring to FIG. 2, location analytics device 230 may detect that network device 224 is within the range of APs 234, and therefore controller 226.

The medium 301 may include instructions 333 stored in the machine-readable storage medium 301 and executable by a processing resource to provide network permissions to the network device responsive to a request from the network device to join a network provided by the network controller. For example, referring to FIG. 2, upon network device 224 attempting to connect to the network via APs 234, network permissions may be provided to the network device 224. As used herein, network permissions refer to a plurality of usage rules that apply to connections within the network. Examples of network permissions may include usage rules allowing the provider of the network to monitor movement of network devices within the network, to monitor application usage and/or network device usage as a condition of using the network. Users connecting to the network may be asked to accept the network permissions as a condition of connecting to the network. Moreover, the network permissions may provide that the user of the network device allow operational settings of their device to be modified in accordance with the location policies of the network.

The environment 300 may include instructions 335 stored in the machine-readable storage medium 301 and executable by a processing resource to determine a location of the network device within the range of the network controller. Again, referring to FIG. 2, the location analytics device 230 may determine the location of network device 224 using APs 234. Although it is described herein that APs 234 may communicate with the location analytics device 230 through a controller, examples are not so limited, and in some examples the APs 234 may communicate with the location analytics device 230 independent of a controller.

The environment 300 may include instructions 337 stored in the machine-readable storage medium 301 and executable by a processing resource to identify a location policy for the network device based on the location of the network device. Again, the location device 230 may determine which network policies apply to that particular location, using location policy device 232, as described in relation to FIG. 2. In such a manner, the environment 300 may include instructions to receive the location policy from a policy server, such as location policy device 232.

The environment 300 may include instructions 339 stored in the machine-readable storage medium 301 and executable by a processing resource to propagate an operating mode of the network device to the network device based on the location policy. Again, as used herein, an operating mode refers to a collection of operational settings of the network device. In some examples, the environment 300 may include instructions to receive the operating mode from a location policy server, such as location policy device 232. That is, the location analytics device 230 may receive from the location policy device 232, an operating mode to be applied to a particular network device.

In some examples, the environment 300 may include instructions stored in the machine-readable storage medium 301 and executable by a processing resource to determine a type of the network device and identify the location policy based on the type of the network device. For example, a first location policy may apply to network devices of a first type in a particular location, whereas a second location policy may apply to network devices of a second type in the same location. Put another way, a mobile phone may have a different location policy in a particular location than a laptop computer. Moreover, in some examples, the environment 300 may include instructions stored in the machine-readable storage medium 301 and executable by a processing resource to detect a plurality of operational capabilities of the network device and identify the location policy based on the operational capabilities. That is, the location policy device 232, and/or the location analytics device 230, may identify the different operational capabilities of a particular network device, and modify the operating mode of the network device based on the operational capabilities. As used herein, operational capabilities of a network device refer to the functions and/or features that may be executed by the network device. Examples of operational capabilities of a network device may include audio and/or visual recording capabilities, text message capabilities, email capabilities, and telecommunications capabilities, among other examples.

Figure 4:
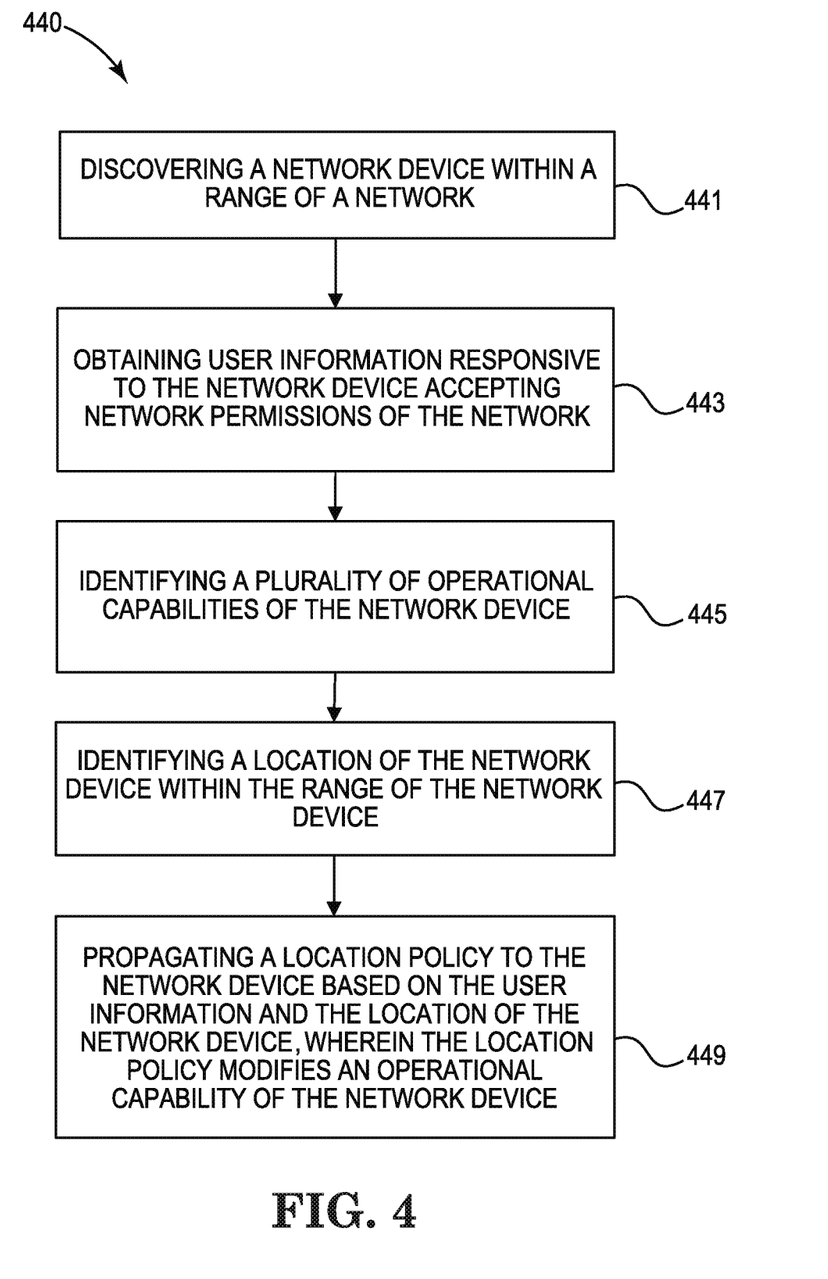
FIG. 4 is a block diagram of an example method, consistent with the present disclosure.

FIG. 4 is a block diagram of an example method 440, consistent with the present disclosure. At 441, the method 440 may include discovering a network device within a range of a network, as described in relation to FIG. 2. At 443, the method 440 may include obtaining user information responsive to the network device accepting network permissions of the network. As used herein, user information refers to information defining characteristics of a user of the network, such as a role or status of the user, as well as a type of network device being used. That is, in some examples, information identifying a particular user, and/or a type of a particular user may be determined. For instance, specific people may have a different location policy in a particular location than others. Put another way, a security officer operating a particular network device, such as a mobile phone, may have a different location policy enforced in a sensitive area than a visitor in the sensitive area. Also, as used herein, 'information' is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

At 445, the method 440 may include identifying a plurality of operational capabilities of the network device, as described in relation to FIG. 3. At 447, the method 440 may include identifying a location of the network device within the range of the network device, as described in relation to FIG. 2. In some examples, identifying the location of the network device may be based on identification of an access point to which the network device is connected. For instance, the location of the network device may be determined based on which access point the network device is closest to. At 449, the method 440 may include propagating a location policy to the network device based on the user information and the location of the network device, wherein the location policy modifies an operational capability of the network device. As used herein, to 'propagate' refers to sending, providing, and/or transmitting a location policy to a network device such that it may be implemented on the network device. In some examples, propagating the location policy to the network device includes disabling a recording feature of the network device while the network device is in the location. In some examples, propagating the location policy to the network device may include disabling a notification feature of the network device while the network device is in the location.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A non-transitory machine-readable medium storing instructions executable by a processor to cause the processor to:
    provide network permissions to a network device responsive to a request from the network device to join a network;
    detect, from a packet transmitted between the network device and the network, a hardware configuration of the network device, responsive to the request;
    detect a plurality of operation functions executable by the network device from the detected hardware configuration of the network device;
    determine a location of the network device within a range of the network, responsive to the request;
    determine a location policy for the network device based on the location of the network device and the plurality of operation functions;
    responsive to acceptance of the network permissions, propagate the location policy to the network device; and
    modify an operating mode of the network device based on the determined location, the determined plurality of operation functions, and the location policy, by modifying an operational setting on the network device to disable network transmissions from the network device.

2. The non-transitory machine-readable medium of claim 1, the location being a first location within the range of the network and the operating mode being a first operating mode, further including instructions to:
- determine a second location of the network device within the range of the network; and
- modify the operating mode of the network device based on the second determined location and the location policy.

3. The non-transitory machine-readable medium of claim 1, the instructions to:
- determine that the network device is no longer in the first location; and
- terminate the operating mode on the network device responsive to the determination that the network device is no longer in the first location.

4. The non-transitory machine-readable medium of claim 1, wherein the instructions to modify the operating mode of the network device include instructions to modify a camera functionality of the network device.

5. The non-transitory machine-readable medium of claim 1, wherein the instructions to modify the operating mode of the network device include instructions to modify a ring volume of the network device.

6. A non-transitory machine-readable medium storing instructions executable by a processor to cause the processor to:
- detect a network device within a range of a network controller;
- provide network permissions to the network device responsive to a request from the network device to join a network provided by the network controller;
- determine, by the network controller, a location of the network device within the range of the network controller, responsive to the request;
- detect, from a packet transmitted between the network device and the network controller, a hardware configuration of the network device, responsive to the request;
- detect by the network controller, a plurality of operation functions executable by the network device from the detected hardware configuration of the network device;
- identify, by the network controller, a location policy for the network device based on the location of the network device and the operation functions; and
- propagate an operating mode of the network device to the network device based on the location policy.

7. The non-transitory machine-readable medium of claim 6, including instructions executable by the processor to cause the processor to determine a type of the network device and identify the location policy based on the type of the network device.

8. The non-transitory machine-readable medium of claim 6, including instructions to receive the location policy from a policy server.

9. The non-transitory machine-readable medium of claim 6, including instructions to receive the operating mode from a location policy server.

10. A method, comprising:
- discovering a first network device within a range of a network;
- obtaining, by a second network device, user information responsive to the first network device accepting network permissions of the network;
- obtaining by the second network device, from a packet transmitted between the first network device and the second network device, a hardware configuration of the first network device, responsive to the first network device accepting the network permissions;
- identifying, by the second network device on the network, a plurality of operation functions executable by the first network device from the detected hardware configuration of the network device, responsive to the first network device accepting the network permissions;
- identifying, at the second network device, a location policy based on the operation functions;
- identifying a location of the first network device within the range of the second network device, responsive to the first network device accepting the network permissions; and
- propagating the location policy to the first network device based on the user information, the operation functions and the location of the first network device, wherein the location policy modifies an ability of the first network device to perform an operation function.

11. The method of claim 10 including identifying the location of the first network device based on identification of an access point to which the first network device is connected.

12. The method of claim 10 wherein propagating the location policy to the first network device includes disabling a recording feature of the first network device while the first network device is in the location.

13. The method of claim 10, wherein propagating the location policy to the first network device includes disabling a notification feature of the first network device while the first network device is in the location.

* * * * *